United States Patent [19]

Haley et al.

[11] Patent Number: 5,493,539

[45] Date of Patent: Feb. 20, 1996

[54] TWO-STAGE DETECTION AND DISCRIMINATION SYSTEM FOR SIDE SCAN SONAR EQUIPMENT

[75] Inventors: Paul H. Haley, Monroeville; John E. Gilmour, Richland Township, both of Pa.

[73] Assignee: Westinghouse Electric Corporation, Pittsburgh, Pa.

[21] Appl. No.: 209,097

[22] Filed: Mar. 11, 1994

[51] Int. Cl.⁶ .......................... G01S 15/00; H04B 11/00; G06K 9/00
[52] U.S. Cl. .......................... 367/88; 367/131; 382/109; 382/190
[58] Field of Search ................... 367/88, 131; 382/27, 382/50, 54, 23, 36

[56] References Cited

U.S. PATENT DOCUMENTS

| | | | |
|---|---|---|---|
| 4,115,761 | 9/1978 | Ueda et al. | 340/146.3 |
| 4,363,104 | 12/1982 | Nussmeier | 364/515 |
| 4,747,149 | 5/1988 | Umeda et al. | 382/18 |
| 4,790,027 | 12/1988 | Scherl | 382/54 |
| 4,803,736 | 2/1989 | Grossberg et al. | 382/22 |
| 4,907,156 | 3/1990 | Dol et al. | 364/413 |
| 4,958,375 | 9/1990 | Reilly et al. | 382/14 |
| 4,965,725 | 10/1990 | Rutenberg | 364/413.1 |
| 5,003,618 | 3/1991 | Meno | 382/54 |
| 5,018,215 | 5/1991 | Nasr et al. | 382/15 |
| 5,060,278 | 10/1991 | Fukumizu | 382/14 |
| 5,065,444 | 11/1991 | Garber | 382/54 |
| 5,181,254 | 1/1993 | Schweizer et al. | 382/54 |
| 5,214,744 | 5/1993 | Schweizer et al. | 382/16 |

OTHER PUBLICATIONS

Schweizer et al., "Automatic Target Detection And Cuing System For An Autonomous Underwater Vehicle (AUV)", 6th Sym. Unmanned, Untethered Submersibles, Oct. 1989.

S. Y. Kung et al., "A Unified Systolic Architecture For Artifical Neural Networks", Journal Of Parallel And Distributed Computing 6, 358–387 (1989).

Pomerleau et al., "Neural Network Simulation At Warp Speed: How We Got 17 Million Connections Per Second", Proc. 1988 IEEE Int'l. Conf. on Neural Networks.

"An Artificial Neural Network Accelerator Using General Purpose 24-Bits Floating Point Digital Signal Processors", Proc. 1989 IEEE Int'l. Joint Conf. On Neural Networks.

P. F. Schweizer et al., "Image Processing Architectures For Autonomous Underwater Vehicles (AUVs) In Mine Detection And Classification Operations", Jul. 1991.

Primary Examiner—Ian J. Lobo

[57] ABSTRACT

An automatic method for finding mines in side scan sonar images using a two-stage detection/discrimination process is provided. This method improves the discrimination process by specialized processing of regions of interest found in the detection process to increase the probability of correctly identifying highlight and shadow regions associated with mine images. Features specifically selected for their ability to discriminate mines are then extracted from these areas for use in the Bayesian discriminator.

6 Claims, 3 Drawing Sheets

TWO-STAGE DETECTION AND DISCRIMINATION SYSTEM FOR SIDE SCAN SONAR EQUIPMENT

BACKGROUND OF THE INVENTION

1. Field of the Invention

This invention relates to a system for detecting mines and, more particularly, to a system for automatically discriminating a side-scan sonar image to determine whether or not there is a mine in the image.

2. Description of Prior Art

Mine detection typically has been performed by analysts viewing side scan sonar images in which the mine appears as a highlight area followed by a shadow area in the range direction. The difficulty of this detection task varies greatly depending on the nature of the background image. On silted areas, only a highlight appears since the background is as dark as the shadow. On the sand, the mine images as a highlight, usually followed by a well-defined shadow. In rocky areas, mines and rocks are often indistinguishable from one another. The way in which the mine lies on the ocean floor relative to the sonar platform affects the intensity and shape of the highlight. At near range, shadows may not be apparent, while at far range they can be quite long.

The sonar analyst must, therefore, bring a great deal of experience to the task of identifying mines using sonar images. This task becomes harder when large amounts of data must be reviewed in a short time. As the data rate increases the analyst's performance drops; that is, more objects are incorrectly classified. Moreover, analysts tend to fatigue with time on the job; a fresh analyst is correct more often than a tired analyst who has been looking at data for several hours. Accordingly, there is a need for an automatic system to aid the analyst in detecting mines.

Although automatic detection systems are not troubled by speed or fatigue, it is difficult to design a machine to match the visual pattern recognition talent of a human analyst. Machine mine detection systems have used a variety of means to detect mines in sonar images including matched filters, neural networks and statistically based cuers. The more successful approaches use a two stage process of detection of areas of interest followed by discrimination based on a more intensive look at the areas of interest. The discrimination phase extracts features based on the shape, texture and intensity of the highlight or shadow and feeds these to a Bayesian based classifier. General classifiers designed to discriminate between man-made objects and natural objects are not specifically optimized to the image features of mines and hence are suboptimal in their performance of mine detection. Accordingly there is a need for a discriminator specifically developed for mine detection.

SUMMARY OF THE INVENTION

The present invention sets forth an approach capable of attacking this formidable task. The main ingredients of the present approach are careful and sophisticated filtering of the data as preparation for the feature extraction task. The use of many features and the grouping of these in appropriate subsets for use in a Bayesian classifier yields a powerful method for automatic mine discrimination.

To overcome shortcomings in prior art detectors, the present invention sets forth a mine detection and discrimination system specifically optimized to find mines and only mines. Not only is detailed information on size and shape used, but also improvements in feature extraction by way of morphological operations such as dilation and erosion. These operators reliably identify and extract the highlight and shadow areas in low contrast and noisy environments.

A system for discriminating candidate mine targets detected by a side scan sonar system is provided in which the candidate mine targets consist of snippet images formed from a matrix of pixels having known greyness levels.

The system includes a highlight filter which expands the size of each highlight area of each snippet image by a predefined amount. Adjacent highlight areas in each snippet image are thereby coalesced to form a single highlight area. A highlight mask generator uses the highlight filtered shipper images to generate a highlight mask by computing a threshold greyness level of the unfiltered snippet images and analyzing the highlight filtered snippet images using the greyness level. A highlight feature extractor extracts highlight features of the snippet images by comparing the highlight mask and the unfiltered snippet images.

A shadow filter expands the size of the areas in the snippet image exhibiting speckle to coalesce those areas of the shipper image exhibiting speckle. The shadow areas in the snippet image are represented by those areas of the snippet image which exhibit a lack of speckle. A shadow mask generator uses the shadow filtered snippet images to generate a shadow mask by selecting those shadow areas in the shadow filtered shipper image which meet area and greyness requirements. A shadow feature extractor extracts shadow features of the snippet images by comparing the shadow mask and the unfiltered snippet images.

A joint highlight/shadow feature calculator calculates joint highlight/shadow features from the highlight features and the shadow features generated by the respective extractors. A Bayesian discriminator analyzes the highlight features, the shadow features and the joint highlight/shadow features to determine whether those features correspond to predefined results which indicate the presence of a mine.

DETAILED DESCRIPTION OF PREFERRED EMBODIMENTS

Figure 1:
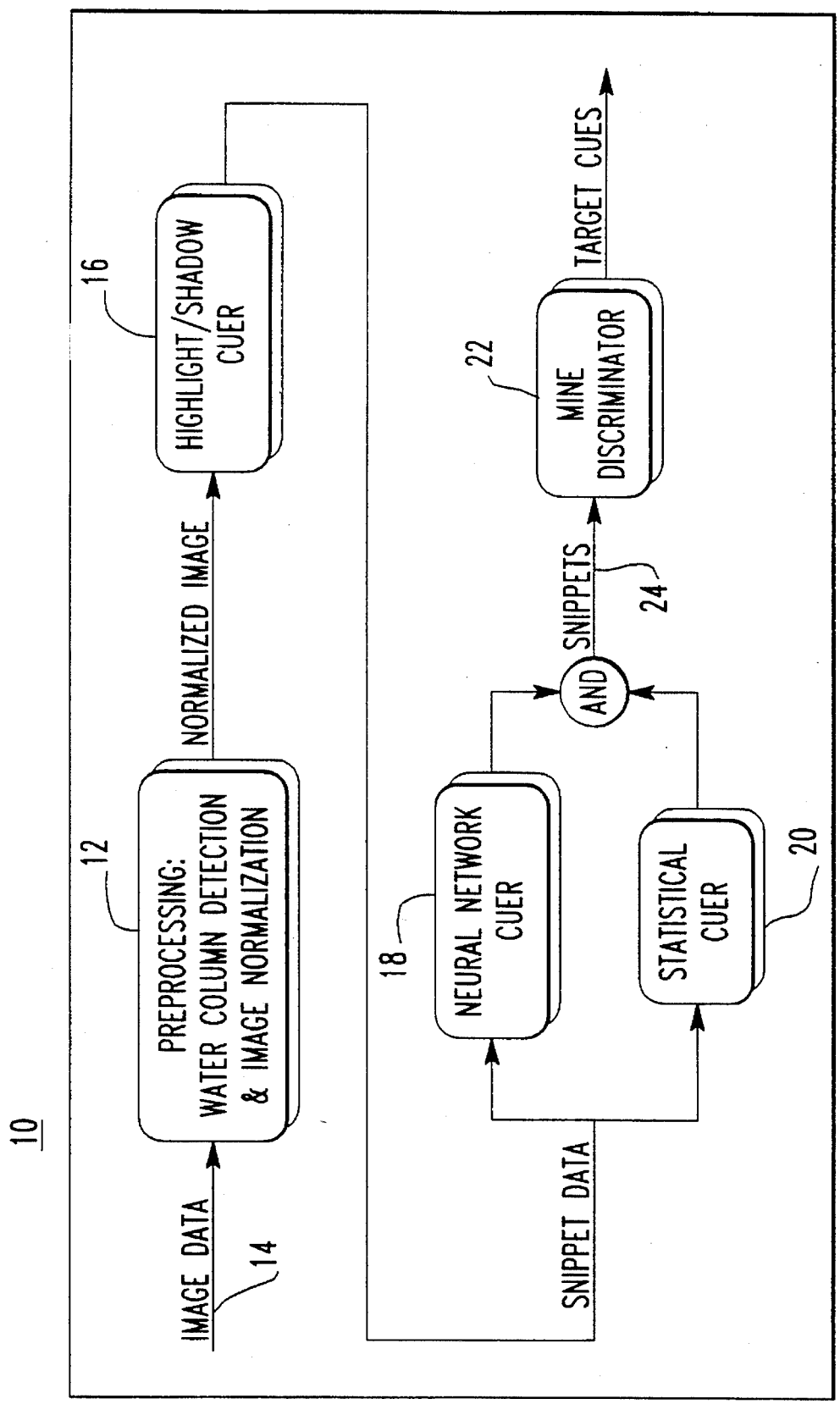
FIG. 1 is a schematic functional block diagram of the presently preferred mine detection system.

The present invention is directed to one operation in an automatic detection process in which side scan sonar data is automatically processed to detect and discriminate mines on the ocean floor. FIG. 1 shows a mine detection system which is comprised of three different functional parts: (1) Preprocessing; (2) Detection; and (3) Discrimination.

The present invention is concerned with the third function of discrimination in which candidate targets are categorized as either mines or not mines. A brief description of the other function parts is needed to understand the environment in which the third functional part operates.

Referring to FIG. 1, preprocessor 12 prepares the sonar image 14 for the detection process by eliminating the average intensity discontinuity at the water column boundary and by renormalizing the image to have a constant mean in the sonar range. This step reduces false detections by the three cuers 16, 18, and 20.

The target detection step uses three different target detection strategies to find mine-like objects in the sonar image. The first cuer, the highlight/shadow cuer 16, convolves an array of idealized matched filters with the whole image to obtain a detection set of clusters of the image where a target is likely. The other two cuers 18 and 20 operate on these clusters to confirm or deny the cluster. Two modes of operation can be selected; either all three cuers must confirm the cluster or two out of three must confirm the cluster. The neural net cuer 18 is trained to recognize targets from a 2D Fourier Transform of a small window that scans the clusters. The statistical cuer 20 looks for statistical outliers of grey-scale statistics and highlight and shadow run-length statistics by passing a window over the clusters. It establishes a reference window by averaging the statistics of $N_{STAT}$ windows randomly chosen from the frame.

Discriminator 22 operates only on the clusters, or snippets, 24 that have passed the detection process. The clusters 24 are rectangular regions whose shape is determined by the highlight shadow cuer 16. They represent only a small fraction of the total frame grey scale data; hence the more computer intensive functions of the discrimination process need only operate on relatively small amounts of data.

A general technique for discriminating man-made objects in sonar data though usable is not specifically optimized to the task of discriminating mines. Accordingly, the present system is highly tuned to find mines and only mines. Such specialization greatly improves its performance.

Figure 2:
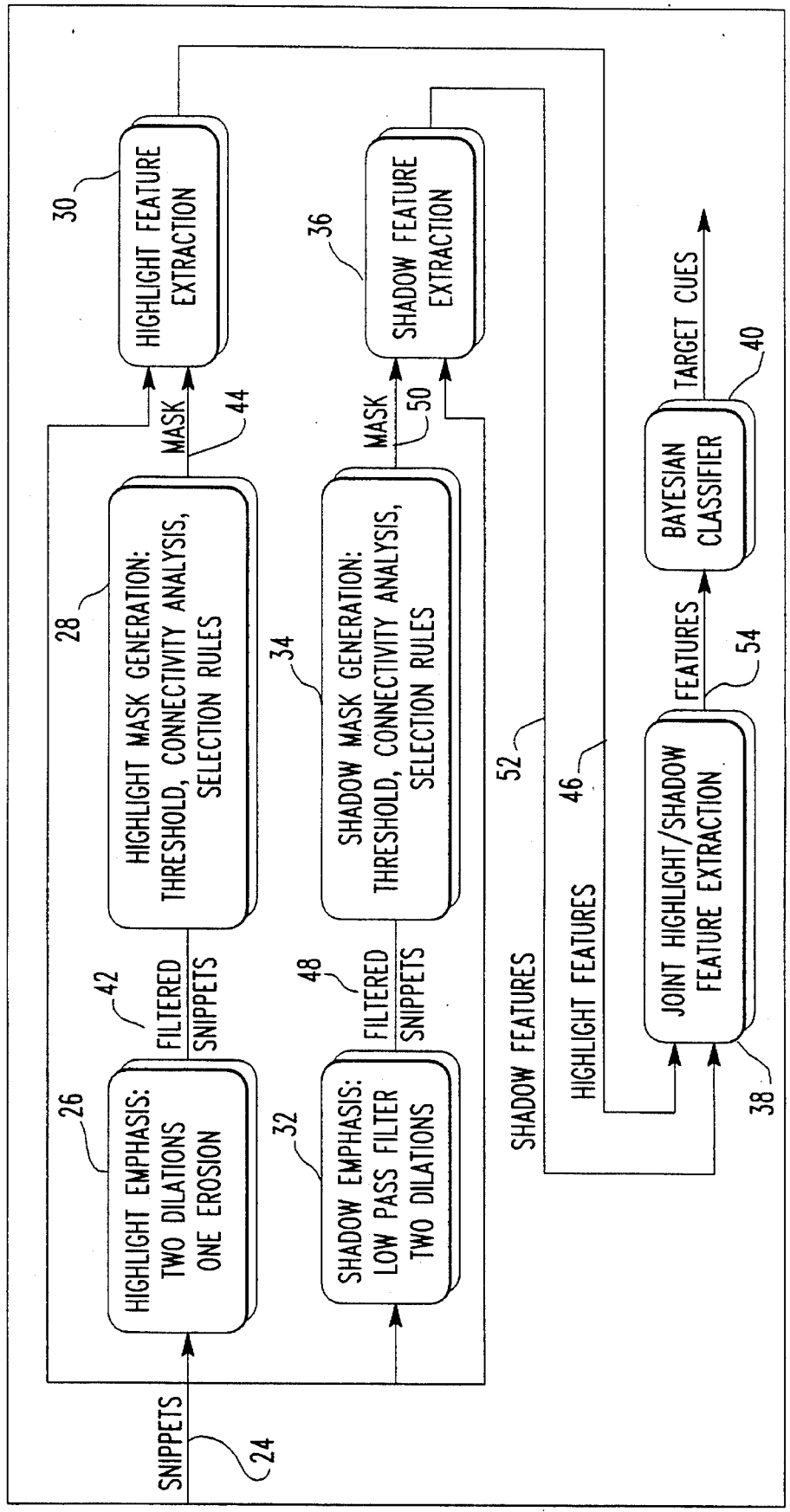
FIG. 2 is a schematic functional block diagram of the presently preferred mine discriminator used in the mine discrimination system of FIG. 1.

As shown in FIG. 2, mine discriminator 22 is composed of eight modules: (1) highlight emphasis filtering module 26; (2) highlight mask generation module 28; (3) highlight feature extraction module 30; (4) shadow emphasis filtering module 32; (5) shadow mask generation module 34; (6) shadow feature extraction module 36; (7) joint highlight/shadow feature calculation module 38; and (8) Bayesian discriminator 40.

Each module of mine discriminator 22 is specifically optimized to mine discrimination. Mine discriminator 22 is set up so that images are assumed to be in starboard format. Port-side images can be represented as starboard images using known techniques. As used in discriminator 22, the track or row index is represented by i or x, and the range or column index is represented by j or y.

The original shipper cluster 24 from the cuers 16, 18 and 20 is expanded on the top, left and bottom borders by $\Delta_1$ and to the right by $\Delta_2$. The preferred expansion values are $\Delta_1=6$, and $\Delta_2=20$. The expansion of the snippet clusters 24 allows margins for filtering operations and captures long shadow areas. The expanded snippet is then filtered by the two dilation operations and one erosion operation. Original snippets that exceed an area bound are declared false alarms and are not processed.

The highlight emphasis module 26 coalesces highlight areas that are close together by using two dilation operations followed by an erosion operation. Dilation and erosion have the following definitions:

(1) Let points $(s_k, t_k)$ be in set S. Let $I_A$ be an image and let $I_B$ be the result of dilating (eroding) $I_A$ by S.

(2) Dilation:

$I_B(i,j) = \text{maximum } [I_A(i+s, j+t)]\ (s,t) \in S$ (3) Erosion:

$I_B(i,j) = \text{minimum } [I_A(i+s, j+t)]\ (s,t) \in S$

The preferred choice for the set S for both dilation operations and the erosion operation for this module 26 is a disk of radius r. Thus, the set S is defined for integers s and t such that $$s^2 + t^2 \leq r_H^2$$

where r is chosen as a function of the resolution of the sonar. For sonars used in mine hunting, a typical range is $1 \leq r_H \leq 2$. The first two dilation operations coalesce highlight areas that have small holes or that are slightly separated. The erosion operation reduces the highlight areas which have grown due to the dilation operations.

The highlight mask generation module 28 generates a highlight mask region by operating on the expanded, filtered, snippet 42.

Using the original image mean $\mu_I$ and standard deviation $\sigma_I$, a highlight mask threshold $$t_{HM} = \mu_I + \sigma_{MH} \sigma_I$$

is computed ($\sigma_{MH}=2.5$ nominal) and used to produce a binary image where highlights equal or exceed the threshold.

A connectivity analysis is then done to compute the area $A_i$, average intensity $I_i$ and centroids $\bar{x}_i$, $\bar{y}_i$ of the blobs. Blobs whose area is less than $A_{Hmin}$ (10) are eliminated. Blobs whose centroids are not within the borders of the original shipper cluster 24 before expansion are eliminated. The highlight blob with maximum product $A_i I_i$ is then saved as the highlight mask 44 to be used in further processing.

The highlight feature extraction module 30 extracts highlight features 46 using the expanded but unfiltered snippet 24 and the highlight mask 44 previously generated. The following steps are used:

1. Let $\Omega_H$ be the points in the highlight mask 44 set and let I(i,j) be the greylevel of the unfiltered snippet 24. Set $t_H = \mu_I + \alpha_H \sigma_I (\alpha_H = 1.0)$
For all $(i, j) \in \Omega_H$ define $$f(i,j) = \begin{cases} (I(i,j) - t_H + 1)/\sigma_I & \text{if } I(i,j) \geq t_H \\ \text{else} \\ 0 \end{cases}$$

$$b(i,j) = \begin{cases} 1 & \text{if } f(i,j) > 0 \\ \text{else} \\ 0 \end{cases}$$

2. Compute Features:
(a) Area:

$$A_H = \sum_{\Omega_H} b(i,j)$$

(b) Moments:
   (i) Highlight strength:

$$m_o = \sum_{\Omega_H} f(i,j)$$

(ii) Highlight Centroid:

$$i_c = \sum_{\Omega_H} i f(i,j)/m_o,\ j_c = \sum_{\Omega_H} j f(i,j)/m_o$$

(iii) Second Central Moments:

$$a = \sum_{\Omega_H} (i - i_c)^2 f(i,j)/m_o$$

-continued $$b = \sum_{\Omega_H} (i-i_c)(j-j_c)f(i,j)/m_o$$

$$c = \sum_{\Omega_H} (j-j_c)^2 f(i,j)/m_o$$

(iv) Major Moment:

$$\lambda_{Hmax} = 0.5 \, (a + c + [(a-c)^2 + 4b^2]^{1/2})$$

(v) Minor Moment:

$$\lambda_{Hmin} = (ac - b^2)/\lambda_{Hmax}$$

(c) Perimeter: Do a connectivity analysis of all blobs of binary image b(i,j).
Compute the total perimeter $p_H$ of all blobs in b(i,j).
(d) Average Highlight Intensity:

$$I_H = m_o/A_H$$

R.M.S. Error:
Let $\Omega_{HB}$ be the set where b(i,j)>0.

$$\bar{e}_H = \left( \sum_{\Omega_{HB}} (f(i,j) - I_H)^2/(A_H - 1) \right)^{1/2}$$

3. Compute six features for Bayesian Classifier if $A_H$ is 2 or greater.

$$x_1 = A_H \qquad x_4 = \ln(\max(\lambda_{Hmin}, 0.1))$$
$$x_2 = \ln I_H \qquad x_5 = \ln p_H$$
$$x_3 = \ln \lambda_{Hmax} \qquad x_6 = \ln(\max(\bar{e}_H, 0.01))$$

The logarithm transform tends to yield a more Gaussian distribution to the features. Since $\lambda_{Hmin}$ and $e_H$ can be zero they are clamped at minimum values of 0.1 and 0.01 respectively. The R.M.S. error measures the noise in the highlight blob.

The shadow emphasis module 32 detects shadows by looking for the absence of speckle. The expanded snippet is filtered by a constant m(2) row by n(3) column low pass filter to coalesce shadow areas. The filtered shipper is dilated using a disk of radius $r_s$(1.5). The snippet is dilated a second time by a horizontal (range) set of length $l_s$(3). The second dilation step broadens small speckle blobs such that the speckle dominates the shipper except in the shadow areas. This makes it easier to detect the shadows.

The shadow mask generation module 34 generates a mask 50 of important shadow areas by operating on the filtered snippet 48 prepared by the shadow emphasis module 32.

In shadow mask generation module 34, the mean of the filtered snippet 48 is computed and a binary image of the snippet is created by setting pixels high if they are less than or equal to 0.4 $\mu_{snippet}$. All shadow blobs below area $A_{Smin}$(15) are deleted. Moreover, all shadow blobs whose centroid is not between the top and bottom original snippet boundaries and not to the right of the original left snippet boundary are also deleted. If the snippet was found to have a valid highlight mask 28 with centroid $i_{Hc}$, $j_{Hc}$ then any shadow blob whose minimum j value is less than $j_{Hc}$ and whose row centroid is not within $n_S$ pixels of $i_{Hc}$ where $3 \leq n_S \leq j \, 6$ is deleted. The remaining shadow mask areas are dilated by a disk of radius $r_{SM}$ (1 to 2).

The last dilation step expands the shadow mask blobs and also coalesces some of them. Unlike the highlight mask 28 which is always a single blob, the shadow mask may be several disjoint blobs that trail the highlight. The above steps eliminate many false detections by requiring the shadow blobs to follow the highlight mask 28 where a highlight has been detected.

The shadow feature extraction module 36 extracts shadow features 52 using the expanded but unfiltered snippet 24 and the shadow mask 50 previously generated. The following steps are used in calculating the features:

1. Let $\Omega_S$ be the points in the shadow mask 50 set.
Set $$t_S = B_S \mu, 0.4 \leq B_S \leq 0.6$$

For all (i, j) $\epsilon \Omega_S$ define $$g(i,j) = \begin{cases} 1 \text{ if } I(i,j) \leq t_S \\ \text{else} \\ 0 \end{cases}$$

2. Compute features:

(a) Area: $A_S = \sum_{\Omega_S} g(i,j)$ (b) Moments:
(i) Shadow Centroid:

$$i_c = \sum_{\Omega_S} ig(i,j)/A_S, \, j_c = \sum_{\Omega_S} jg(i,j)/A_S$$

(ii) Second Central Moments:

$$a = \sum_{\Omega_S} (i-i_c)^2 g(i,j)/A_S$$

$$b = \sum_{\Omega_S} (i-i_c)(j-j_c)g(i,j)/A_S$$

$$c = \sum_{\Omega_S} (j-j_c)^2 g(i,j)/A_S$$

(iii) Major Moment:

$$\lambda_{Smax} = 0.5 \, (a+c[(a-c)^2+4b^2]^{1/2})$$

(iv) Minor Moment:

$$\lambda_{Smin} = (ac-b^2)/\lambda_{Smax}$$

(c) Extent:
Find the minimum and maximum value of i for which g(i, j)=1.
(i) Vertical extent, a long track $$\Delta x_s = i_{max} - i_{min}$$

Find the minimum and maximum value of j for which g(i,j)=1.
(ii) Horizontal extent, in range $$\Delta y_s = j_{max} - j_{min}$$

(d) Perimeter:
Do a connectivity analysis of all blobs of binary image g(i,j). Compute total perimeter $P_S$ of all blobs in g(i,j).

3. Compute six features for Bayesian discriminator 40 if $A_S$ is 2 or greater.

$x_7 = \ln A_S$ $x_8 = \ln \lambda_{Smax}$ $x_9 = \ln (\max(\lambda_{Smin}, 0.1))$ $x_{10} = \ln \Delta x_S$ $x_{11} = \ln \Delta y_S$ $x_{12} = \ln p_S$ It is possible to compute the depth or darkness of the shadow in a fashion similar to the average highlight intensity. However, the grey level intensity in a shadow is a function of the noise level and thus is not highly correlated with the object producing the shadow.

Mine targets generally have both highlight features 46 and shadow features 52 although not always. When both do occur, a set of features 54 based on the geometrical relation of the shadow to the highlight can be calculated by the joint highlight/shadow feature extraction module 38. The following steps define these features:

1. From the highlight and shadow calculations, retrieve the following or compute if necessary.
   (a) Highlight Centroid: $i_{Hc}$, $j_{Hc}$
   (b) Highlight maximum extent in range: $j_{Hmax}$
   (c) Shadow Centroid $i_{Sc}$, $j_{Sc}$
   (d) Shadow minimum extent in range: $j_{Smin}$
2. Compute the following joint features:
   (a) Average Vertical Difference:

$$\Delta x_{H/S} = i_{Hc} - i_{Sc}$$

(b) Horizontal Separation $$\Delta y_{H/S} = j_{Hmax} - j_{Smin}$$

Other parameters such as percent overlap in the vertical direction of the shadow extent with the highlight extent can be defined, but the above are preferred. The use of the centroids for vertical difference is less sensitive to noise than extent measurements since it is averaged over the blob area. With these, two additional features, joint highlight/shadow feature extraction module computes the following two features for the Bayesian discriminator 40.

$$x_{13} = \Delta x_{H/S}$$

$$x_{14} = \Delta y_{H/S}$$

The logarithm transform is not used since both quantities $x_{13}$ and $x_{14}$ can be negative.

The Bayesian discriminator 40 processes subsets of the fourteen features previously defined to confirm or deny the snippet as a mine. The Bayesian discriminator 40 has the following functional form when discriminating between two classes: Let $$r(\underline{x}) = f_M(\underline{x})/(f_M(\underline{x}) + f_N(\underline{x}))$$

where $f_M(\underline{x})$ is the conditional distribution of feature vector $\underline{x}$ for snippets of mines and $f_N(\underline{x})$ is the conditional distribution of feature vector x for snippets of non-mine areas. Using a threshold t chosen to balance the risk of missed detections against the occurrence of too many false alarms, the snippet is declared a mine if $$r(\underline{x}) \geq t.$$

The definitions of $f_M(\underline{x})$ and $f_N(\underline{x})$ depend on four possible outcomes:

1. Highlight and shadow detected in snippet;
2. Highlight only detected in snippet;
3. Shadow only detected in snippet; or
4. Neither highlight nor shadow detected in snippet.

The Bayesian discriminator 40 is initialized using a training set of data in which the locations of mines are known. From this set the following statistics are gathered.

| Outcome | Features | Mines | | | Non Mines | | |
|---|---|---|---|---|---|---|---|
| | | No. | Mean | Co-Variance | No. | Mean | Co-Variance |
| 1 | x1 to x14 | $N_{M1}$ | $\mu_{M1}$ | $\Sigma_{M1}$ | $N_{N1}$ | $\mu_{N1}$ | $\Sigma_{N1}$ |
| 2 | $x_1$ to $x_6$ | $N_{M2}$ | $\mu_{M2}$ | $\Sigma_{M2}$ | $N_{N2}$ | $\mu_{N2}$ | $\Sigma_{N2}$ |
| 3 | $x_7$ to $x_{12}$ | $N_{M3}$ | $\mu_{M3}$ | $\Sigma_{M3}$ | $N_{N3}$ | $\mu_{N3}$ | $\Sigma_{N3}$ |
| 4 | | $N_{M4}$ | | | $N_{N4}$ | | |

With these statistics a multivariate normal distribution is used to approximate the distributions of the first three outcomes.

The dimension of $\underline{x}$, $\mu$ and $\Sigma$ is a function of the outcome. For the fourth outcome $\underline{x}$, $\mu$ and $\Sigma$ are undefined, only the number of occurrences $N_{M4}$ and $N_{N4}$ are defined. For i=1 to 3 the distributions are $f_{Mi}(\underline{x}) =$ $$\left( \frac{N_{Mi}}{N_{Mi} + N_{Ni}} \right) \frac{\exp[-0.5(\underline{x} - \mu_{Mi})^T \Sigma_{Mi}^{-1} (\underline{x} - \mu_{Mi})]}{(2\pi)^{n_i/2} |\Sigma_{Mi}|^{1/2}}$$

and $f_{Ni}(\underline{x}) =$ $$\left( \frac{N_{Ni}}{N_{Mi} + N_{Ni}} \right) \frac{\exp[-0.5(\underline{x} - \mu_{Ni})^T \Sigma_{Ni}^{-1} (\underline{x} - \mu_{Ni})]}{(2\pi)^{n_i/2} |\Sigma_{Ni}|^{1/2}}$$

where $n_i$ is the number of features 54, that is, the dimension of x. For the fourth outcome, $r = N_{M4}/(N_{M4} + N_{N4})$.

Figure 3:
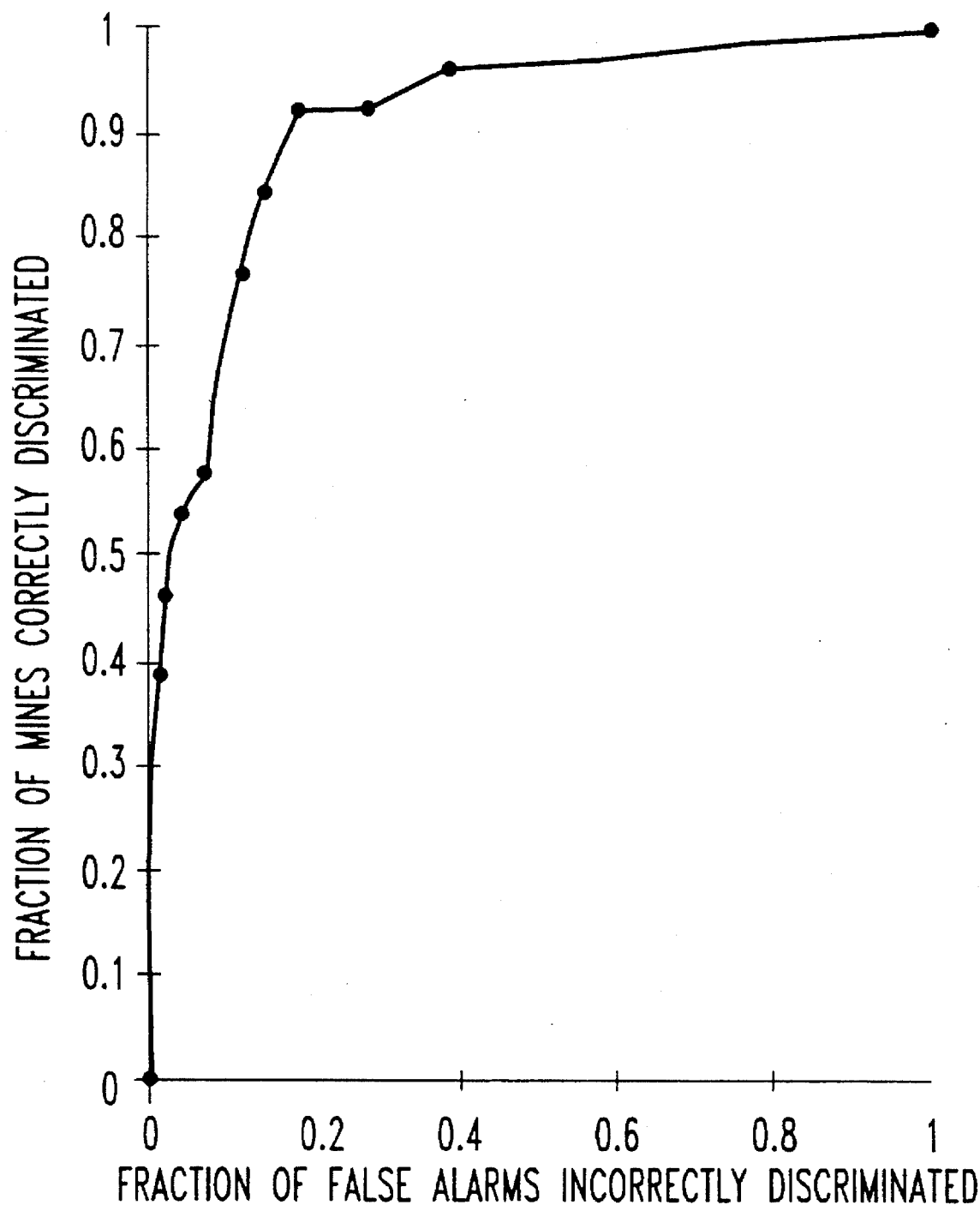
FIG. 3 is a graph showing the performance of the discriminator represented in FIG. 2 in detecting mines.

These algorithms were coded in C and executed on a SUN workstation. A set of 60 sonar images, 512 by 1024 pixels with some containing mines and for which ground truth on the location of the mines was known, was used to initialize the discriminator. FIG. 3 shows the performance of the discriminator in which the fraction of mines correctly classified is plotted against the fraction of false alarms incorrectly classified.

The use of morphological filters consisting of two dilations followed by an erosion operation on the greylevel snippet data 24 improves the detection of highlights associated with mines by coalescing highlight areas that are sometimes fractured.

The generation of a highlight mask 44 from the above filtered image 42 using rules concerning mask area and mask position within the snippet greatly increases the probability that the correct highlight area is identified while eliminating highlight areas of no significance. The use of a mask 44 to define the highlight area of interest allows highlight features 46 to be computed over highlights that may have disjoint segments.

The calculation of six highlight features 46 using the original unfiltered greyscale data within the highlight mask area makes maximal use of shape, intensity and high frequency texture data within the snippet. The use of the logarithm transformation on the calculated features not only produces variates that are approximately normal in distribution for ease in implementation in the Bayesian classifier 40, but also eliminates the need for other features which are products of powers of the basic features. Hence compactness which is defined as $A/4\pi p^2$ need not be computed since, under the logarithm transformation, it is a linear combination of log A and log p.

The use of a linear low pass filter on the greylevel snippet data smooths and coalesces shadow areas while at the same time removes low level speckle in the shadow areas. High level speckle in the background area, though reduced, still remains significant. The use of two morphological filters consisting of dilation by a disk and dilation by a horizontal structuring element coalesces the speckle in background areas and highlight areas. Since shadow areas have very little speckle this second filtering operation greatly increases the contrast between shadow areas and non-shadow areas. This simplifies the shadow mask generation.

The generation of a shadow mask 50 using rules concerning mask area, position within the snippet and geometrical relations to the highlight mask greatly increases the probability that the correct shadow areas have been identified while eliminating shadow areas of no significance. The use of a mask 50 to define shadow areas of interest allows shadow features 52 to be computed over shadow areas that may be disjoint.

The calculation of six shadow features 52 using the original unfiltered greyscale data within the shadow mask area makes maximal use of the shape information in the snippet. Since speckle noise sets a floor for shadow greyscale values, the shadow features do not use either intensity or noise level and thus differ from highlight features. Thus the features selected are optimized to the shadow characteristics.

The use of joint highlight/shadow position features 54 increases the probability of correct detection for a given false alarm rate.

The Bayesian discriminator 40 makes optimal use of the information found in the snippet by having a separate classifier for each of the four possible outcomes. The use of logarithm mapping functions increases the goodness of fit of the multivariate normal distribution to the experimental distributions.

In the foregoing specification certain preferred practices and embodiments of this invention have been set out, however, it will be understood that the invention may be otherwise embodied within the scope of the following claims.

We claim:

1. A system for discriminating candidate mine targets detected by a side scan sonar system, said candidate mine targets consisting of snippet images formed from a matrix of pixels, each snippet image having highlight areas and shadow areas having known greyness levels, comprising:

a. a highlight filter to expand the size of each said highlight area of each said snippet image by a predefined amount to generate highlight filtered snippet images, whereby adjacent highlight areas in each said snippet image are coalesced to form a single highlight area;

b. a highlight mask generator which generates a highlight mask from said highlight filtered snippet images by computing a highlight threshold greyness level and analyzing said highlight filtered snippet images using said highlight threshold greyness level;

c. a highlight feature extractor which extracts highlight features of said snippet images by comparing said highlight mask and said snippet images;

d. a shadow filter to expand the size of the areas in said snippet image exhibiting speckle to coalesce those areas of said snippet image exhibiting speckle to generate shadow filtered snippet images, whereby said shadow areas in said snippet image are represented by those areas of said snippet image exhibiting a lack of speckle;

e. a shadow mask generator which generates a shadow mask from said shadow filtered snippet images by selecting those shadow areas in said shadow filtered snippet image which meet area and greyness requirements;

f. a shadow feature extractor which extracts shadow features of said snippet images by comparing said shadow mask and said snippet images;

g. a joint highlight/shadow feature calculator which calculates joint highlight/shadow features from said highlight features and said shadow features; and h. a Bayesian discriminator which analyzes said highlight features, said shadow features and said joint highlight/shadow features to determine whether said features correspond to predefined results which indicate the presence of a mine.

2. A system for discriminating candidate mine targets detected by a side scan sonar system, said candidate mine targets consisting of snippet images formed from a matrix of pixels, each snippet image having highlight areas and shadow areas having known greyness levels, comprising:

a. means for expanding the size of each said highlight area of each said snippet image by a predefined amount to generate highlight filtered snippet images, whereby adjacent highlight areas in each said snippet image are coalesced to form a single highlight area;

b. means for generating a highlight mask from said highlight filtered snippet images by computing a highlight threshold greyness level and analyzing said highlight filtered snippet images using said highlight threshold greyness level;

c. means for extracting highlight features of said snippet images by comparing said highlight mask and said snippet images;

d. means for expanding the size of the areas in said snippet image exhibiting speckle to coalesce those areas of said snippet image exhibiting speckle to generate shadow filtered snippet images, whereby said shadow areas in said snippet image are represented by those areas of said snippet image exhibiting a lack of speckle;

e. means for generating a shadow mask from said shadow filtered snippet images by selecting those shadow areas in said shadow filtered snippet image which meet area and greyness requirements;

f. means for extracting shadow features of said snippet images by comparing said shadow mask and said snippet images;

g. means for calculating joint highlight/shadow features from said highlight features and said shadow features; and h. means for analyzing said highlight features, said shadow features and said joint highlight/shadow features to determine whether said features correspond to predefined results which indicate the presence of a mine.

3. The system of claim 2 wherein said means for analyzing is a Bayesian discriminator.

4. The system of claim 2 wherein said means for expanding the size of each said highlight area of each said shipper image by a predefined amount is a highlight filter.

5. The system of claim 2 wherein said means for expanding the size of the areas in said snippet image exhibiting speckle to coalesce those areas of said snippet image exhibiting speckle is a shadow filter.

6. A method for discriminating candidate mine targets detected by a side scan sonar system, said candidate mine targets consisting of snippet images formed from a matrix of pixels, each snippet image having highlight areas and shadow areas having known greyness levels, comprising the steps of:

a. filtering said snippet images to expand the size of each said highlight area of each said snippet image by a predefined amount to generate highlight filtered snippet images, whereby adjacent highlight areas in each said snippet image are coalesced to form a single highlight area;

b. generating a highlight mask from said highlight filtered snippet images by computing a highlight threshold greyness level and analyzing said highlight filtered snippet images using said highlight threshold greyness level;

c. extracting highlight features of said snippet images by comparing said highlight mask and said snippet images;

d. filtering said snippet images to expand the size of the areas in said shipper image exhibiting speckle to coalesce those areas of said shipper image exhibiting speckle to generate shadow filtered snippet images, whereby said shadow areas in said snippet image are represented by those areas of said snippet image exhibiting a lack of speckle;

e. generating a shadow mask from said shadow filtered snippet images by selecting those shadow areas in said shadow filtered snippet image which meet area and greyness requirements;

f. extracting shadow features of said snippet images by comparing said shadow mask and said snippet images;

g. calculating joint highlight/shadow features from said highlight features and said shadow features; and h. analyzing said highlight features, said shadow features and said joint highlight/shadow features to determine whether said features correspond to predefined results which indicate the presence of a mine.

* * * * *